April 22, 1958     J. B. THOMAN ET AL     2,831,556
COMBINED HOOD RECEIVER AND CONDUCTOR TUBE
Filed Dec. 20, 1954
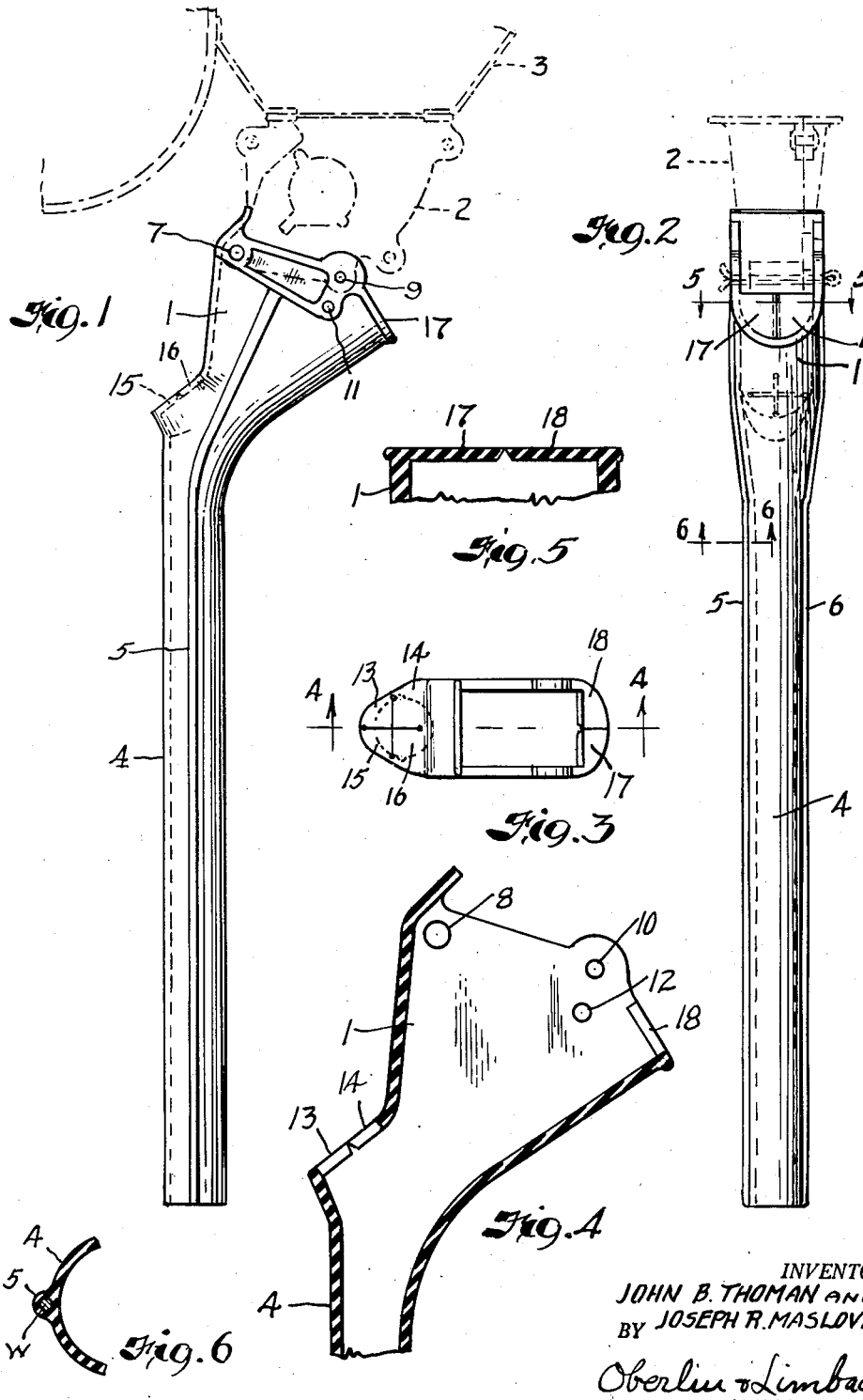
INVENTORS
JOHN B. THOMAN AND
BY JOSEPH R. MASLOVE, JR.
Oberlin Limbach
ATTORNEYS United States Patent Office 2,831,556
Patented Apr. 22, 1958

2,831,556

COMBINED HOOD RECEIVER AND CONDUCTOR TUBE

John B. Thoman, Hamburg, N. Y., and Joseph R. Maslove, Jr., Mentor, Ohio, assignors to The Eagle-Picher Company, Cincinnati, Ohio, a corporation of Ohio Application December 20, 1954, Serial No. 476,136

7 Claims. (Cl. 193—9)

This invention relates as indicated to a combined hood receiver and conductor tube for grain drills and the like, and more particularly to a flexible receiver and tube of unitary construction adapted for attachment to a single or double feed run or built-in run assembly of a grain drill, planter, fertilizer attachment, or fertilizer unit.

In one standard form of grain drill or planter now in wide use, the grain to be planted is stored in an elongated hopper mounted on wheels and adapted to be drawn by a team or tractor. Beneath the hopper is a feed run assembly including a rotatable shaft adapted to be driven in timed relation to rotation of the wheels and including devices for delivering measured quantities of grain or other material to the hood receivers of the conductor tubes suspended therebeneath. There will ordinarily be a number of such hood reecivers and conductor tubes corresponding to the number of rows to be planted by the drill. The conductor tubes are preceded by small shoes or plows set to produce furrows of the desired regulated depth and the grain or other seed delivered to the conductor tubes by the aforesaid measuring device is dropped into the furrows thus produced. In the past, such conductor tubes have ordinarily been made of canvas or occasionally of spiral wound steel strip to afford the necessary flexibility as they are drawn along with their lower ends frequently contacting the soil. The upper ends of such tubes have been secured to sheet metal hood receivers adapted to be secured to the feed run assembly. Such prior art tubes have not been very satisfactory in their resistance to climatic conditions.

Moreover, drills of the type under consideration are often employed for the application of fertilizers either simultaneously with the seed or separately, and such fertilizers sometimes have a deleterious effect upon the canvas or metal tubes. The tubes and hood receivers of the prior art are furthermore not very readily detachable from the feed run assembly when this is desired for cleaning purposes. It is, of course, important that the tube should be flexible, as above indicated, but at the same time it is not usually desired that such tube should readily flex laterally of the path of travel since this may result in scattering of the seed outside the furrow produced by the associated shoe or plow.

It is accordingly a principal object of our invention to provide a combined hood receiver and conductor tube of unitary construction which may be readily attached to and detached from the feed run assembly of the drill.

Another object is to provide such conductor tube which will be resistant to weather, abrasion and the action of chemical fertilizers.

Still another object is to provide such conductor tube which will readily flex in the path of travel of the same but will be less readily flexible laterally thereof.

A further object is to provide such combined hood receiver and conductor tube including provision in the hood receiver for the insertion of additional supplemental feed tubes.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side view of our new combined hood receiver and conductor tube illustrating the manner in which the same may be secured to an appropriate feed run assembly of a grain drill or the like;

Fig. 2 is a front view of the Fig. 1 assembly taken at right angles to Fig. 1;

Fig. 3 is a top plan view of the hood receiver portion;

Fig. 4 is an enlarged section taken on the line 4—4 on Fig. 3;

Fig. 5 is an enlarged section taken on the line 5—5 on Fig. 2; and

Fig. 6 is a fragmentary transverse section taken on the line 6—6 on Fig. 2.

Referring now more particularly to Figs. 1 and 2 of the drawing, the hood receiver portion 1 of our new combined hood receiver and conductor tube is adapted to be fitted over the hood 2 of the feed run assembly of a standard grain drill 3, such feed run assembly being adapted to deliver measured quantities of seed or the like into the upper end of such hood receiver. Hood receiver 1 is molded integrally with conductor tube 4 of flexible plastic material such as rubber, vinyl (polymers and copolymers of polyvinyl acetate and polyvinyl chloride), and polyethylene. Laterally projecting, longitudinally extending reinforcing ribs 5 and 6 are molded in the outer sides of such combined hood receiver and conductor tube to enhance the lateral rigidity of the latter without detracting from the flexibility of the tube in the path of travel of the same. Stability may be further enhanced by longitudinally extending resilient wires W embedded in such ribs, if desired (Fig. 6).

The upper end of the hood receiver portion is formed with aligned lateral openings 7 and 8 adapted to fit over corresponding outwardly projecting studs on the hood 2 of the feed run assembly. Two sets of aligned openings 9, 10 and 11, 12 are adapted to fit over a cotter pin or similar studs on the feed run assembly so that the angle at which tube 4 depends therefrom may be adjusted by pivotal movement about the axis of apertures 7, 8. Inasmuch as the hood receiver in which such apertures are formed is of resiliently distensible or deformable plastic material, the hood receiver may be secured to the feed run assembly by stretching the same to fit over the studs, the hood receiver being dimensioned to fit in unstressed condition when thus secured.

Two auxiliary upwardly disposed openings are provided in offset portions of the hood receiver for the insertion of supplemental feed discharge tubes when desired. One such opening is in general vertical alignment with tube 4 (the hood receiver portion being offset) and is closed by four integral flaps 13, 14, 15 and 16. The other auxiliary opening is adjacent the opposite upper edge of the hood receiver portion and is closed by flaps 17 and 18. Such closures are not entirely airtight and afford a degree of venting whereby any tendency to build up a slight vacuum in the conductor tube as the drill travels in avoided. The flaps do, however, serve to close the openings to exclude wind currents and eliminate turbulence which would be detrimental to control of the planting or fertilizing operation.

It will be seen from the foregoing that we have provided a novel combined hood receiver and conductor tube of integral flexible construction adapted to be secured to the feed run assembly of a grain drill or the like without the employment of special tools. The conductor tube, while normally relatively rigid, may nevertheless be flexed as necessary in the path of travel of the drill but is less readily flexed laterally so that obstructions encountered in its travel do not tend to scatter the seed laterally of the corresponding furrow produced by the associated shoe or plow. While the tube will generally be substantially straight, as shown, it may also be molded on a curve when it may be necessary to avoid interference with some other part of the implement. The tube will in some instances be kinked of necessity, as when the bottom shoe or furrow opener has been drawn up in clearance position, but our new tube will of its own accord return to normal form and recover its original molded shape when proper clearance is again provided. The combined hood receiver and conductor tube are molded in a single operation with considerable economy in manufacture, the plastic material employed not only being flexible and wear-resistant but also substantially immune to attack by chemical fertilizers and moisture. It will also desirably be of material not deleteriously affected by sunlight and weather. Auxiliary feed tubes may readily be inserted in the flap covered openings, which openings automatically close themselves when such auxiliary feed tubes are later removed. The rearwardly flaring funnel-shaped hood receiver has flattened parallel sides permitting a number of the devices to be arrayed in close side-by-side position. The material is sufficiently flexible that in the event the tube should clog it may be cleared by manually squeezing it. The tight fit made with the feed run, however, greatly reduces the likehihood of the inside of the tube becoming wet. The interior of the tube is smooth and this also facilitates free flow of the material, in contrast to canvas and spiral metal tubes previously employed.

Other modes of applying the principle of the invention may be employed, change being made as regards the details described, provided the features stated in any of the following claims or the equivalent of such be employed.

We therefore particularly point out and distinctly claim as our invention:

1. A combined hood receiver and conductor tube for grain drills and the like comprising a unitary molded hood receiver and a generally straight elongated tube extending therefrom of resiliently deformable plastic material, said tube having longitudinal reinforcing ribs on opposite sides to reduce lateral flexibility of said tube without substantially affecting flexibility thereof in the direction of its path of travel when mounted on a drill, and said hood receiver portion molded integrally with said tube flaring rearwardly and opening upwardly to receive measured quantities or grain and the like from the feed run assembly of the drill to which it is secured, the upper portion of said hood receiver having pivotal lateral attachment means for attaching to said drill, a flap covered opening in such rearwardly flaring portion adjacent the upper edge of said hood receiver, and a flap covered opening in an offset portion of said hood receiver generally vertically above the upper end of said tube.

2. A combined hood receiver and conductor tube for grain drills and the like comprising a unitary molded hood receiver and a generally straight elongated tube extending therefrom of resiliently deformable plastic material, said tube having longitudinal reinforcing ribs on opposite sides to reduce lateral flexibility of said tube without substantially affecting flexibility thereof in the direction of its path of travel when mounted on a drill, and said hood receiver portion molded integrally with said tube flaring rearwardly and opening upwardly to receive measured quantities of grain from the feed run assembly of the drill to which it is secured, the sides of said hood receiver being substantially flat and parallel and having opposed apertures therein for reception of studs on such drill, there being a plurality of vertically related sets of such apertures adjacent one end of said hood and one set of such apertures adjacent the other end whereby said hood and tube may be swingably adjusted forwardly and rearwardly relative to such drill about the axis of such latter set of attaching apertures, an integral flap covered upwardly facing opening adjacent the upper edge of an end of said flaring hood receiver, and a flap covered opening in an offset portion of said hood receiver generally vertically above the upper end of said tube.

3. A unitary molded plastic receiver and tube adapted to be secured to the feed run assembly of a grain drill or the like comprising an elongated generally straight flexible tube having longitudinal reinforcing ribs on opposite sides to reduce lateral flexibility of said tube without substantially affecting flexibility thereof in the direction of its path of travel when mounted on a drill, and an upper resiliently deformable flaring receiver portion having lateral apertures for securing to such drill, a principal upper opening for receiving grain or the like from such feed run assembly, and an auxiliary upper opening normally closed by integral flexible flap means.

4. A unitary molded plastic receiver and tube adapted to be secured to the feed run assembly of a grain drill or the like comprising an elongated generally straight flexible tube having longitudinal reinforcing ribs on opposite sides to reduce lateral flexibility of said tube without substantially affecting flexibility thereof in the direction of its path of travel when mounted on a drill, and an upper resiliently deformable flaring receiver portion having lateral apertures for securing to such drill, a principal upper opening for receiving grain or the like from such feed run assembly, and an auxiliary upper opening in an offset of said receiver portion substantially vertically above the upper end of said tube normally closed by integral flexible flap means.

5. A hood receiver for grain drills and the like comprising an upwardly flaring flexibly deformable plastic funnel having substantially flat side walls, said walls having apertures adjacent their upper edges for attachment of said receiver to such drill, and said funnel having an apertured upwardly opening offset portion normally closed by integral flexible plastic flap means.

6. A conductor tube for grain drills and the like comprising an elongated flexible plastic tube having longitudinally extending integral ribs on opposite sides thereof, said ribs being reinforced by longitudinally extending resilient wire inserts therein, and attaching means at one end for mounting on such drill with said ribs disposed laterally.

7. A conductor tube for grain drills and the like comprising an elongated flexible plastic tube having longitudinally extending resilient wires embedded in opposite sides thereof, and attaching means at one end for mounting on such drill with said wires disposed laterally.

References Cited in the file of this patent

UNITED STATES PATENTS

| | | |
|---|---|---|
| 105,690 | Ingels | July 26, 1870 |
| 550,310 | Woodward | Nov. 26, 1895 |
| 1,265,165 | Bartley | May 7, 1918 |
| 2,428,679 | Oehler | Oct. 7, 1947 |
| 2,626,548 | Williams | Jan. 27, 1953 |